US012525212B2

(12) United States Patent
Goto

(10) Patent No.: US 12,525,212 B2
(45) Date of Patent: Jan. 13, 2026

(54) CHORD PROCESSING METHOD AND CHORD PROCESSING DEVICE

(71) Applicant: YAMAHA CORPORATION, Hamamatsu (JP)

(72) Inventor: Misa Goto, Ota-ku (JP)

(73) Assignee: YAMAHA CORPORATION, Hamamatsu (JP)

( * ) Notice: Subject to any disclaimer, the term of this patent is extended or adjusted under 35 U.S.C. 154(b) by 939 days.

(21) Appl. No.: 17/407,524

(22) Filed: Aug. 20, 2021

(65) Prior Publication Data

US 2021/0383783 A1 Dec. 9, 2021

Related U.S. Application Data

(63) Continuation of application No. PCT/JP2020/011795, filed on Mar. 17, 2020.

(30) Foreign Application Priority Data

Mar. 26, 2019 (JP) ................................ 2019-057715

(51) Int. Cl.
*G10H 1/38* (2006.01)
*G10H 1/00* (2006.01)

(52) U.S. Cl.
CPC .......... *G10H 1/383* (2013.01); *G10H 1/0025* (2013.01); *G10H 2210/576* (2013.01)

(58) Field of Classification Search
CPC . G10H 1/383; G10H 1/0025; G10H 2210/576
See application file for complete search history.

(56) References Cited

U.S. PATENT DOCUMENTS 9,818,388 B2 * 11/2017 Bergman .............. G10H 1/386
10,140,967 B2 11/2018 Fan (Continued)

FOREIGN PATENT DOCUMENTS

CN 102087849 A 6/2011
CN 105761713 A 7/2016

(Continued)

OTHER PUBLICATIONS

Office Action issued in Chinese Appln. No. 202080021083.6, mailed Nov. 1, 2023. English translation provided.

(Continued)

*Primary Examiner* — Jianchun Qin
(74) *Attorney, Agent, or Firm* — ROSSI, KIMMS & McDOWELL LLP

(57) ABSTRACT

A chord processing device includes a memory storing instructions, and a processor configured to implement the stored instructions to execute a plurality of tasks, including: a receiving task that receives a first chord consisting of plural notes, an analysis task that determines whether the first chord c is a subject chord, and a converting task that, in a case where the analysis task determines that the first chord is the subject chord, converts the first chord into a second chord that relates to the first chord a case where the first chord satisfies a prescribed chord-related condition relating to the first and second chords, while not converting the first chord in a case where the first chord does not satisfy the prescribed chord-related condition.

11 Claims, 9 Drawing Sheets

(56) References Cited

U.S. PATENT DOCUMENTS

| | | | | |
|---|---|---|---|---|
| 2003/0051595 | A1 * | 3/2003 | Hasegawa | G10H 1/38 84/637 |
| 2013/0205977 | A1 | 8/2013 | Buskies | |

FOREIGN PATENT DOCUMENTS

| | | | | |
|---|---|---|---|---|
| CN | 107195287 | A | | 9/2017 |
| JP | 2000163065 | A | | 6/2000 |
| JP | 2003099032 | A | | 4/2003 |
| JP | 2005049444 | A | * | 2/2005 |
| JP | 3632467 | B2 | * | 3/2005 |
| JP | 2007163532 | A | | 6/2007 |
| JP | 2008089975 | A | | 4/2008 |
| JP | 2014149366 | A | | 8/2014 |
| JP | 2016224462 | A | | 12/2016 |
| WO | 2011060504 | A1 | | 5/2011 |

OTHER PUBLICATIONS

Office Action issued in Japanese Appln. No. 2019-057715 mailed on Nov. 1, 2022. English machine translation provided.

"Newly renewed "Search/Replacement" function", Dec. 27, 2007, <URL: http://sstyle.blog.kawai.co.jp/e401.html> Cited in NPL 1. English machine translation provided.

"How to delete all specific characters in a document at once with TeraPad, Michinarini!" May 5, 2018, <URL: https://michinari.work/archives/moji_remove.html > TeraPad. Cited in NPL 1. English machine translation provided.

International Search Report issued in Intl. Appln. No. PCT/JP2020/011795 mailed Jun. 16, 2020. English translation provided.

Written Opinion issued in Intl. Appln. No. PCT/JP2020/011795 mailed Jun. 16, 2020.

Naohiko. "Improving TPS to Tackle Non Key Constituent Note." IPSJ SIG Technical Report. Feb. 11, 2011: 1-6. vol. 2011-MUS-89. No. 10. Includes English abstract of "Extension of TPS (tonal pitch space) for Accommodating Chords Including Atonal Constituent Notes Aiming at Application to Jazz Music Theory." Transactions of Information Processing Society of Japan, Feb. 11, 2011. Cited in Specification.

"To show the difficulty level of a guitar chord with numbers?", Natsubayashi Guitar Elementary School [online], Internet: <URL:https://web.archive.org/web/20180708621 07/http;//knatsubrand81.com/hikikata/hikikata-071.html> Cited in NPL 1 and NPL 2. English machine translation provided.

English translation of Written Opinion issued in Intl. Appln. No. PCT/JP2020/011795 mailed Jun. 16, 2020, previously cited in IDS filed Aug. 20, 2021.

* cited by examiner

FIG. 4

| SUBJECT CHORD |
|---|
| F |
| F# |
| F#7 |
| B |
| ⋮ |

FIG. 5

| |
|---|
| X2 |
| C |
| G |
| A |
| FM7 |
| ⋮ |

CHORD PROCESSING METHOD AND CHORD PROCESSING DEVICE

This is a continuation of International Application No. PCT/JP20/011795 filed on Mar. 17, 2020, and claims priority from Japanese Patent Application No. 2019-057715 filed on Mar. 26, 2019, the entire content of which is incorporated herein by reference.

TECHNICAL FIELD

The present disclosure relates to a technique for presenting chords.

BACKGROUND

Various techniques for presenting chords of a musical piece have been proposed conventionally. For example, JP-A-2003-099032 (PTL 1) discloses a technique for converting particular chords in a time series of chords of a musical piece into other chords. A chord conversion table is used which correlates particular conversion subject chords with their replacement chords.

SUMMARY

In the technique of PTL 1, all particular chords included in a time series of chords are converted into other chords using the chord conversion table. This results in a problem that musical impression is not maintained. The concept of the present disclosure has been conceived in view of the above circumstances and has an object of converting chords while maintaining its musical impression.

To solve the above problem, a chord processing method according to one aspect of the disclosure includes, receiving a first chord consisting of plural notes, determining whether the first chord is a subject chord, and converting, in a case where the determining determines that the first chord is the subject chord, the first chord into a second chord that relates to the first chord in a case where the first chord satisfies a prescribed chord-related condition relating to the first and second chords, while not converting the first chord in a case where the first chord does not satisfy the prescribed chord-related condition.

A chord processing device according to another aspect of the disclosure includes a memory storing instructions and a processor configured to implement the stored instructions to execute a plurality of tasks, including: a receiving task that receives a first chord consisting of plural notes, an analysis task that determines whether the first chord is a subject chord; and a converting task that, in a case where the analysis task determines that the first chord is the subject chord, converts the first chord into a second chord that relates to the first chord in a case where the first chord satisfies a prescribed chord-related condition relating to the first and second chords, while not converting the first chord in a case where the first chord does not satisfy the prescribed chord-related condition.

BRIEF DESCRIPTION OF DRAWINGS

Exemplary embodiment(s) of the present invention will be described in detail based on the following figures, wherein:

FIG. 4 is a schematic table showing designation data;

FIG. 5 is a schematic table showing conversion data;

DESCRIPTION OF EMBODIMENTS

Embodiment 1

Figure 1:
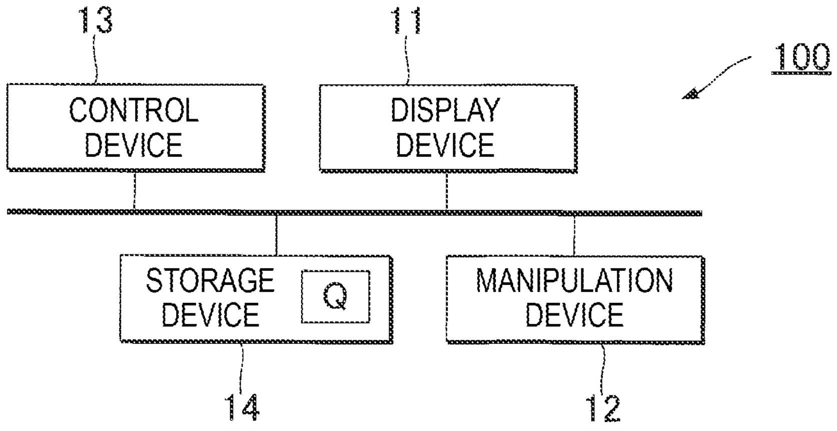
FIG. 1 is a block diagram showing the configuration of a chord processing device according to a first embodiment of the present disclosure.

FIG. 1 is a block diagram showing an example configuration of a chord processing device 100 according to a first embodiment of the present disclosure. The chord processing device 100 is a computer system for presenting chords of a musical piece to a user. A chord consists of plural notes. The chord processing device 100 includes a display device 11 (an example of presentation device), a manipulation device 12 a control device 13, and a storage device 14. For example, the chord processing device 100 is a portable information terminal such as a cellphone or a smartphone or a portable or stationary information terminal such as a personal computer.

The display device 11 (e.g., liquid crystal display panel) displays various images under the control of the control device 13. More specifically, the display device 11 displays chords of a musical piece. The manipulation device 12 is an input device for receiving, an instruction from a user. For example, the manipulation device 12 is plural manipulation members that can be manipulated by a user or a touch panel that detects contact with the display surface of the display device 11.

Figure 2:
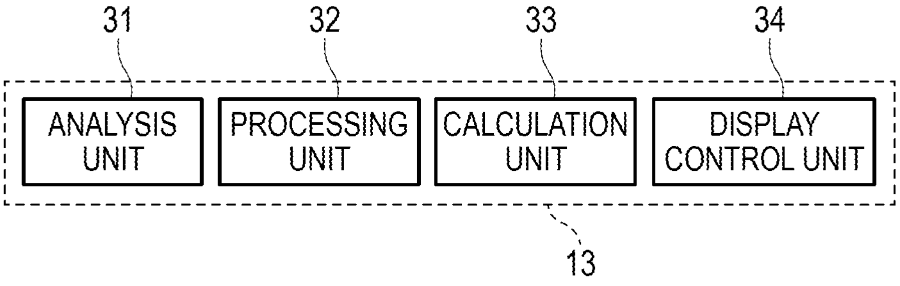
FIG. 2 is a block diagram showing a functional configuration of a control device.

For example, the control device 13 is a single or plural processors for controlling the individual elements of the chord processing device 100. For example, the control device 13 includes one or more processors each being a CPU (central processing unit), a GPU (graphics processing unit), a DSP (digital signal processor), an FPGA (field-programmable gate array), an ASIC (application-specific integrated circuit), or the like. FIG. 2 is a block diagram showing an example functional configuration of the control device 13. The control device 13 realizes plural functions (analysis unit 31, processing unit 32, calculation unit 33, and display at control unit 34) for presenting chords to a user by performing plural tasks according to programs stored in the storage device 14. The functions of the control device 13 may be implemented by a set (i.e., system) of plural devices. Alternatively, all of part of the functions of the control device 13 may be implemented by dedicated electronic circuits.

The storage device 14 shown in FIG. 1 is a single or plural memories each made up of a known recording medium such as a magnetic recording medium or a semiconductor recording medium. The storage device 14 stores programs to be run by the control device 13 and various kinds of data to be used by the control device 13. The storage device 14 may be a combination of plural kinds of recording media. Furthermore, the storage device 14 may be a portable recording medium that can be attached to and detached from the chord processing device 100 or an external recording medium (e.g., online storage) with which the chord processing device 100 can communicate over a communication network.

Figure 3:
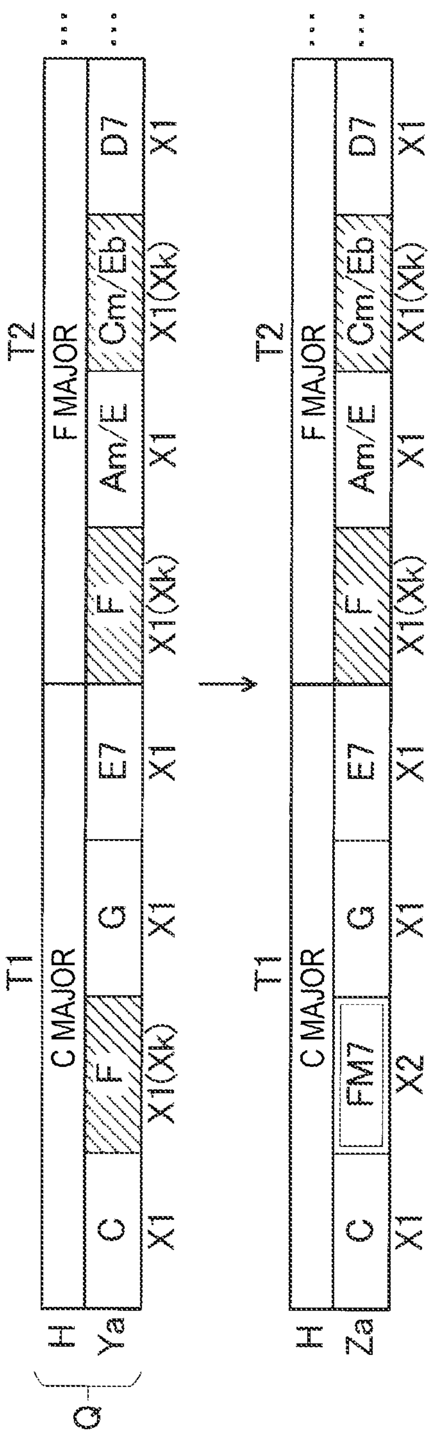
FIG. 3 is a schematic table showing musical data.

More specifically, the storage device 14 stores data (hereinafter referred to as "musical piece data") Q representing the play contents of a musical piece. FIG. 3 is a schematic diagram of the musical piece data Q. The musical piece data Q includes Ya chord sequence Ya and pieces of key information H of the musical piece. The chord sequence Ya is data in which plural first chords X1 of the musical piece are arranged in time series. The pieces of key information H are information indicating keys of the musical piece. Each interval (hereinafter referred to as a "continuous interval") T in which the key remains the same in the musical piece is correlated with a piece of key information H. Since the key varies in the musical piece, the musical piece data Q includes plural pieces of key information H corresponding to plural respective continuous intervals T (T1, T2, . . . ). FIG. 3 shows an example in which the musical piece data Q includes key information H indicating a key "C major" in the continuous interval T1 and key information H indicating a key "F major" in the continuous interval T2. There exist 24 kinds of keys each of which corresponds to a combination of one of plural keynotes (more specifically, 12 semitones) and a key name (major or minor). However, the number of kinds of keys is not limited to 24. The musical piece data Q is stored in the storage device 14 in advance. Alternatively, the chord processing device 100 may infer the musical piece data Q from, for example, an acoustic signal representing play sounds or singing sounds of the musical piece.

The chord sequence Ya can be presented to a user as it is. However, the chord sequence Ya may include first chords X1 that are not desired by a user. For example, the chord sequence Ya may include first chords X1 that a user has difficulty in playing because of insufficient playing techniques. In this situation, demand for playing another chord (typically a chord that can be played easily) instead of each first chord X1 arises. In view of the above circumstances, particular chords (hereinafter referred to as "subject chords") of the plural first chords X1 constituting the chord sequence Ya are converted into second chords X2 that relate to the respective first chords X1.

The subject chords are chords that a user wants to convert into second chords X2. More specifically, the subject chords are chords that are difficult to play and they are designated by the user in advance. Each subject chord is a chord that requires a user to press down plural strings simultaneously by one finger of the user in playing a stringed instrument and is, for example, a barre chord that is played by a manipulation including the barre (ceja). In the first embodiment, each barre chord that requires a user to press down one finger on five or six strings (e.g., chord "F" or "F7") is a subject chord to be converted into a second chord X2.

The storage device 14 stores designation data that indicates subject chords. FIG. 4 is a schematic table showing the designation data. The designation data includes the subject chords designated by the user. Plural subject chords can be designated by the user. The user designates the subject chords by manipulating the manipulation device 12. The number of barre chords designated as subject chords among the plural barre chords is optional.

Typically, the second chords X2 are chords that are similar to the first chords X1 in a musical sense. For example, the second chords X2 are chords that can be played more easily than the first chords. More specifically, the second chords X2 are chords other than the subject chords (i.e., chords that can be played without the barre manipulation).

The storage device 14 stores conversion data indicating second chords X2. FIG. 5 is a schematic table showing the conversion data. The conversion data includes plural second chords X2. That is, the conversion data is data in which second chords X2 as candidates of results of conversion on the first chords X1 are registered.

The analysis unit 31 shown in FIG. 2 determines whether each of plural first chords X1 that are part of the chord sequence Ya is a subject chord. More specifically, if a subject chord that matches with a first chord X1 exists in the plural subject chords registered in the designation data, the analysis unit 31 determines that the first chord X1 is a subject chord. If no subject chord that matches with a first chord X1 exists in the designation data, the analysis unit 31 determines that the first chord X1 is not a subject chord. In FIG. 3, hatched blocks indicate first chords X1 that are determined to be subject chords. FIG. 3 shows an example case that among the plural first chords X1 in the chord sequence Ya first chords X1 "F" and "Cm/Eb" are determined to be subject chords. In the following description, a first chord X1 that has been determined to be a subject chord is referred to as a "selected chord Xk."

Now assume a configuration (hereinafter referred to as a "comparative example") in which all selected chords Xk in the chord sequence Ya are converted into second chords X2. The comparative example has a problem that musical impression of the chord sequence Ya before conversion of the selected chords Xk into the second chords X2 is not maintained in a chord sequence Za after the conversion. More specifically, musical impression is not maintained in a case that a selected chord Xk that is important in maintaining the tonality is converted into a second chord X2. An example chord that is important in maintaining the tonality is a chord having, as a root, a note that is in a prescribed interval from keynote of a key. For example, a tonic chord having, as a root, a note that is in a first-degree relationship with the keynote of a key (i.e., a note that coincides with the keynote) or a dominant chord having, as a root, a note that is in a fifth-degree relationship with the keynote of the key is a chord that is important in maintaining the tonality. Musical impression is not maintained also in a case that to a selected chord Xk is converted into a second chord X2 that is not similar to the former in a musical sense. In view of the above, the processing unit 32 shown in FIG. 2 converts a selected chord Xk into a second chord X2 in a case that prescribed chord-related conditions are satisfied and does not convert a selected chord Xk in a case that these conditions are not satisfied. The prescribed conditions include a first condition and a second condition.

The first condition is that a selected chord Xk is not an important chord in maintaining the tonality. More specifically, the first condition is that a selected chord Xk is not the tonic chord or dominant chord of the key. For example, the processing unit 32 determines the tonic chord and the dominant chord of the key indicated by key information H from the key information H in a continuous interval T including the selected chord Xk. The processing unit 32 determines that the first condition is not satisfied in a case that the selected chord Xk is the tonic chord or the dominant chord, and determines that the first condition is satisfied in a case that the selected chord Xk is neither the tonic chord nor the dominant chord. The tonic chord and the dominant chord of each of plural keys may be stored in the storage device 14 in advance.

On the other hand, the second condition is a condition that relates to the degree of similarity between a selected chord Xk and a second chord X2. More specifically the second condition is that the degree of similarity is higher than a threshold value for a second chord X2 whose degree of similarity with the selected chord Xk is highest (i.e., a second chord X2 that is most similar to the selected chord Xk) among the plural second chords X2 in the conversion data shown in FIG. 5. The processing unit 32 selects a second chord X2 having a highest degree of similarity among the plural second chords X2 and determines whether the degree of similarity of this second chord X2 is higher than the threshold value. The processing unit 32 determines that the second condition is not satisfied in a case that the degree of similarity of a second chord X2 having a highest degree of similarity with a selected chord Xk is lower than the threshold value, and determines that the second condition is satisfied in a case that the degree of similarity of this second chord X2 is higher than the threshold value.

The degree of similarity between a second chord X2 and a selected chord Xk is calculated by the calculation unit 33 shown in FIG. 2. The degree of similarity is an index indicating a distance or correlation between a vector representing a second chord X2 and a vector representing a selected chord Xk. The degree of similarity increases as a selected chord Xk and a second chord X2 becomes more similar to each other. The vector representing a second chord X2 or a selected chord Xk is a basic space function as described in, for example, the document Naohiko Yamaguchi and Noboru Sugamura, "Extension of TPS (tonal pitch space) for Accommodating Chords Including Atonal Constituent Notes—Aiming at Application to Jazz Music Theory," Transactions of Information Processing Society of Japan, Feb. 11, 2011.

In a case that it is determined that both of the first condition and the second condition are satisfied, the processing unit 32 converts a selected chord Xk into a second chord X2. More specifically, the processing unit 32 converts the selected chord Xk into a second chord X2 whose degree of similarity with the selected chord Xk is highest and higher than the threshold value. In a case that at least one of the first condition and the second condition is not satisfied, a selected chord Xk is not converted into a second chord X2 and is kept as it is (i.e., remains a first chord X1). The processing unit 32 generates a chord sequence Za as shown in FIG. 3 by converting each piece of selected data of the chord sequence Ya into a second chord X2 in a case that the first condition and the second condition are satisfied. In FIG. 3, a second chord X2 is indicated by a block enclosed by a double line. The chord sequence Za is a time series of chords that is a mixture of first chords X1 and second chords X2.

FIG. 3 shows the chord sequence Za in which among the plural selected chords Xk the selected chord Xk "F" in the continuous interval T1 is converted into a second chord X2 "FM7." A selected chord Xk "F" in the continuous interval T1 of the chord sequence Ya is converted into a second chord X2 "FM7" because the selected chord Xk "F" is neither the tonic chord nor dominant chord of the key "C major" of the continuous interval T1 and the degree of its similarity with a second chord X2 "FM7" which is most similar to this selected chord Xk is higher than the threshold value. On the other hand, a selected chord Xk "F" in the continuous interval T2 of the chord sequence Ya is not converted because it is the tonic chord "F" of the key "F major" of the continuous interval T2 (that is, the first condition is not satisfied). A selected chord Xk "Cm/Eb" in the continuous interval T2 of the chord sequence Ya is not converted either because the degree of its similarity with a second chord X2 that is most similar to this selected chord Xk is lower than the threshold value (i.e., the second condition is not satisfied) though the selected chord Xk "Cm/Eb" is neither the tonic chord nor dominant chord of the key "F major" of the continuous interval T2. In the following description, the processing that the processing unit 32 converts a selected chord Xk into a second chord X2 will be referred to as "conversion processing."

The display control unit 34 displays the chord sequence Za on the display device 11. That is, when a first chord X1 has been converted into a second chord X2, the display control unit 34 displays the second chord X2 on the display device 11 in place of the first chord X1. When a first chord X1 has not been converted into a second chord X2, the display control unit 34 displays the first chord X1 on the display device 11. The display device 11 displays the chord sequence Za under the control of the display control unit 34. That is, the chord sequence Za is presented to the user. The chord sequence Za is displayed in a desired manner. The display control unit 34 may display both of the chord sequence Ya and the chord sequence Za on the display device 11.

Figure 6:
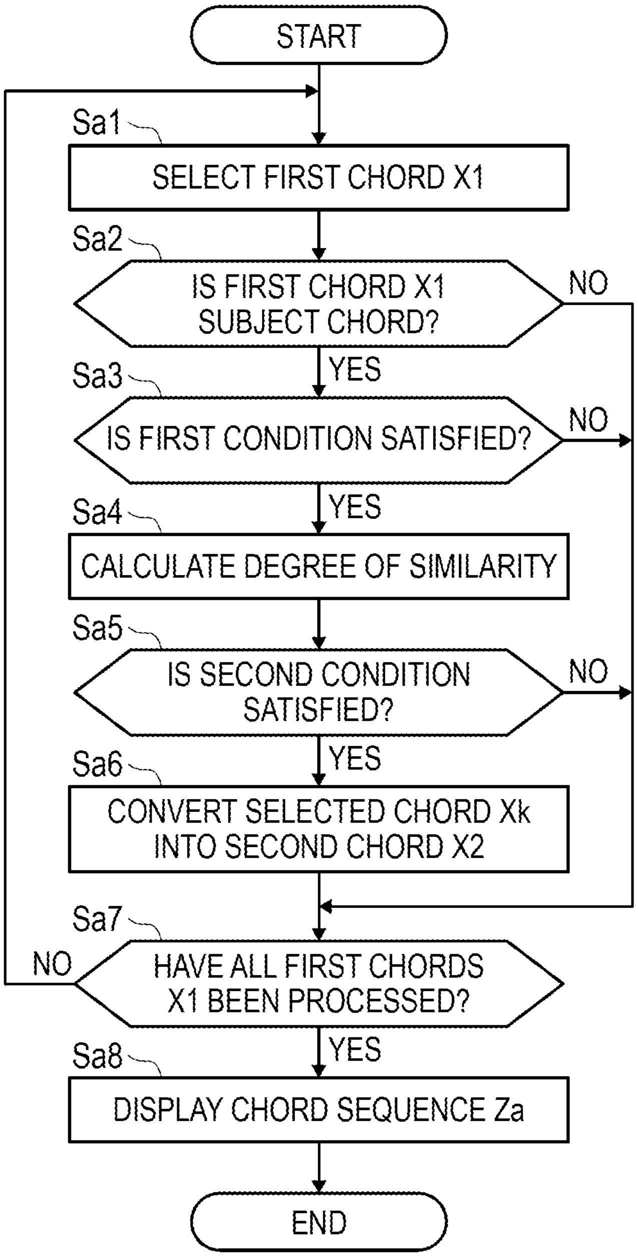
FIG. 6 is a flowchart of a process that is executed by the control device.

FIG. 6 is a flowchart of a process by which the control device 13 of the chord processing device 100 determines a chord sequence Za from a chord sequence Ya. For example, the process of FIG. 6 is started being triggered by an instruction from the user. The analysis unit 31 selects the plural first chords X1 of the chord sequence Ya sequentially one by one (Sa1). For example, the first chords X1 are selected in order from the head of the chord sequence Ya to its tail. The analysis unit 31 determines whether the first chord X1 selected at step Sa1 is a subject chord (Sa2). In a case that the first chord X1 is a subject chord (Sa2: yes), the processing unit 32 determines whether the first chord X1 (i.e., selected chord Xk) satisfies the first condition (Sa3). More specifically, it is determined whether the selected chord Xk is a tonic chord or a dominant chord.

In a case that the first condition is satisfied (Sa3: yes), the calculation unit 33 calculates the degree of similarity between the selected chord Xk and each of plural second chords X2 (Sa4). The processing unit 32 selects one, having a highest degree of similarity, of plural second chords X2 and determines whether the second condition is satisfied (Sa5). More specifically, it is determined whether the degree of similarity of this selected second chord X2 is higher than the threshold value. In a case that the second condition is satisfied (Sa5: yes), the processing unit 32 converts the selected chord Xk into the second chord X2 having the highest degree of similarity (Sa6).

The analysis unit 31 determines whether steps Sa1-Sa6 have been executed for all the first chords X1 of the chord sequence Ya (Sa7). In a case that the first chord X1 is not a subject chord (Sa2: no), the analysis unit 31 executes step Sa7 without executing steps Sa3-Sa6. In a case that the first condition is not satisfied (Sa3: no) or the second condition is not satisfied (Sa5: no), the analysis unit 31 executes step Sa7 without converting the selected chord Xk. That is, where the selected chord Xk is an important chord for maintaining the tonality and/or none of plural second chords X2 is musically similar to the selected chord Xk, the selected chord Xk is kept as it is without being converted into a second chord X2. In a case that all the first chords X1 have been processed (Sa7: yes), the display control unit 34 displays a chord sequence Za on the display device 11 (Sa8). On the other hand, an unprocessed first chord(s) X1 remains (Sa7: no), the process returns to step Sa1. The chord sequence Za which is smaller in the number of selected chords Xk than the chord sequence Ya is generated as a result of the execution of the above process. In a case that none of the selected chords Xk included in the chord sequence Ya satisfies the first condition and the second condition, the chord arrangement of the chord sequence Za remains the same as that of the chord sequence Ya. That is, the number of selected chords Xk in the chord sequence Za is the same as that in the chord sequence Ya.

It is noted that step Sa5 may be executed earlier than step Sa3. That is, whether the selected chord Xk satisfies the first condition may be determined when it has satisfied the second condition. Furthermore, step Sa5 may be such that it is determined that the second condition is not satisfied in a case that there is no second chord X2 whose degree of similarity is higher than the threshold value and it is determined that the second condition is satisfied in a case that there exists a second chord X2 whose degree of similarity is higher than the threshold value. In the above configuration, in a case that the degrees of similarity of plural second chords X2 are higher than the threshold value, at step Sa6 the selected chord Xk is converted into a second chord X2 having a highest degree of similarity among these plural second chords X2.

As is understood from the above description, in the first embodiment, when a first chord X1 is a subject chord, it is converted into a second chord X2 in a case that it satisfies the prescribed conditions. And the first chord X1 is kept as it is without being converted in a case that it does not satisfy the conditions. Thus, in contrast to the comparative example, chords can be converted while musical impression is maintained.

In the first embodiment, since the prescribed conditions include the first condition, a first chord X1 is not converted in a case that it has a root that is in a prescribed interval relationship with the keynote of a key. That is, first chords X1 that are important in maintaining the tonality are kept as they are. Thus, musical impression can be maintained between the chord sequence Ya and the chord sequence Za. Furthermore, since the prescribed conditions include the second condition, a first chord X1 is not converted in a case that the degrees of similarity of second chords X2 are lower than the threshold value. A chord sequence Za can thus be generated in which the musical impression of the chord sequence Ya is maintained.

In the configuration of the first embodiment in which each chord that requires the user to press down one finger on plural strings simultaneously in playing a stringed instrument is made a subject chord, a first chord X1 that is such a chord can be converted into a second chord X2. Furthermore, in the first embodiment, since each second chord X2 is a chord other than a subject chord, in a case that the user wants to avoid playing the subject chord, a first chord X1 can be converted into a second chord X2 that is different from the subject chord.

In the first embodiment, when a first chord X1 has been convened into a second chord X2, the second chord X2 is presented to the user in place of the first chord X1. When a first chord X1 has not been converted into a second chord X2, the first chord X1 is presented to the user. Thus, a chord sequence Za in which musical impression of the chord sequence Ya is maintained can be presented to the user.

Embodiment 2

A second embodiment of the disclosure will be described. In each of the embodiments described below, each element that is the same m function as a corresponding element used in the first embodiment will be given the same symbol as the latter and will not be described in detail as appropriate.

There may occur a case that a certain user has difficulty in playing even if first chords X1 (i.e., selected chords Xk) that are subject chords in a chord sequence Ya are converted into second chords X2. In view a such circumstances, the second embodiment provides the user with a chord sequence to replace the chord sequence Ya. More specifically, a chord sequence (hereinafter referred to as a "transposed chord sequence") Yb obtained by transposing the chord sequence Ya is presented to the user.

Figure 7:
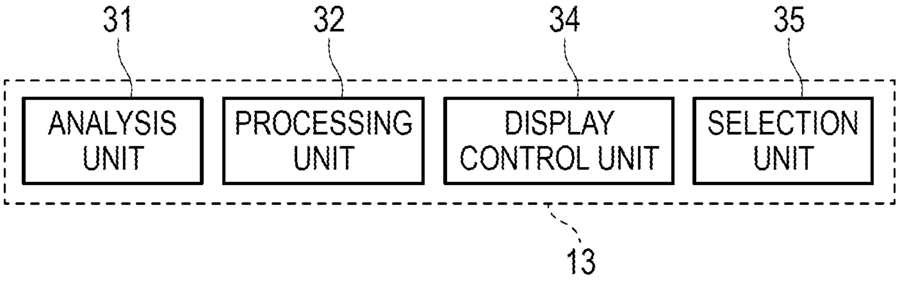
FIG. 7 is a block diagram showing a functional configuration of a control device employed in a second embodiment.

FIG. 7 is a block diagram showing a functional configuration of a control device 13 employed in the second embodiment. The control device 13 realizes plural functions (analysis unit 31, processing unit 32, selection unit 35, and display control unit 34) for presenting a transposed chord sequence Yb to the user.

The processing unit 32 determines transposed chord sequences Yb that are different in key from the chord sequence Ya by performing determination processing (hereafter referred to as "transposition processing") including transposition of the chord sequence Ya. The transposition processing is processing of determining transposed chord sequences Yb each of which is a time series of plural first chords X1 that are different than in the chord sequence Ya by transposing the chord sequence Ya (an example of a "base chord sequence). More specifically, the transposition processing determines plural transposed chord sequences Yb by transposing the chord sequence Ya by different transposition amounts δ.

Figure 8:
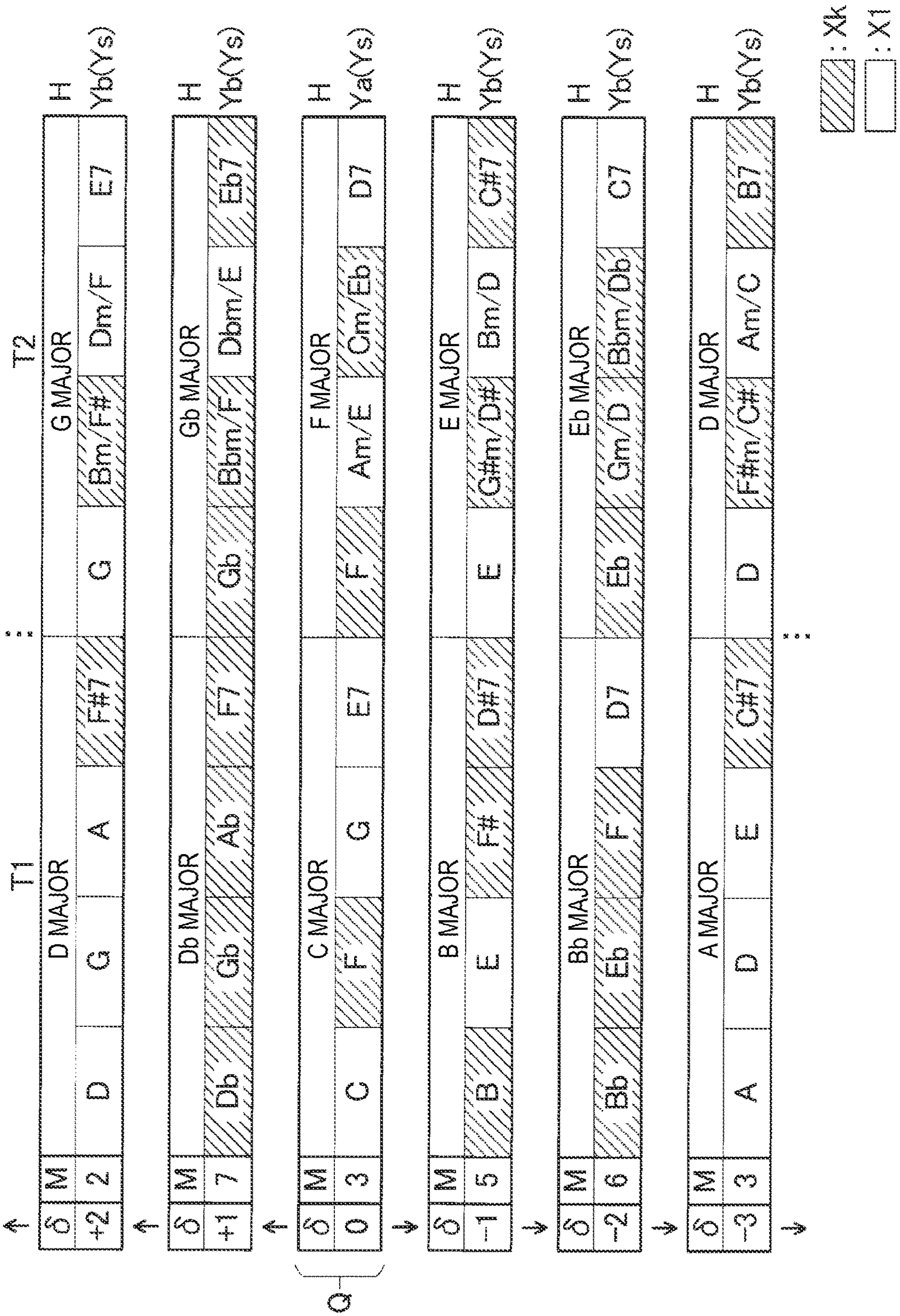
FIG. 8 is a schematic diagram showing plural candidate chord sequences.

FIG. 8 is a schematic diagram showing plural transposed chord sequences Yb that are determined by the transposition processing. For example the transposition processing changes, in units of a semitone, the transposition amount δ by which to transpose the chord sequence Ya which is a base (O). For example, the transposition processing generates six transposed chord sequences Yb by transposing the chord sequence Ya to the high-tone side by respective transposition amounts δ of one semitone (+1), two semitones (+2), . . . , six semitones (−6) and five transposed chord sequences Yb by transposing the chord sequence Ya to the low-tone side by respective transposition amounts δ of one semitone (−1), two semitones (−2), . . . , five semitones (−5). That is, eleven transposed chord sequences Yb are determined that are different from each other in transposition amount δ on the basis of the chord sequence Ya. In the following description, each of the chord sequence Ya and the transposed chord sequences Yb will be referred to as a "candidate chord sequence Ys." That is, the one chord sequence Ya and the 11 transposed chord sequences Yb constitute 12 candidate chord sequences Ys.

The analysis unit 31 shown in FIG. 7 calculates, for each of the plural candidate chord sequences Ys, an index (hereinafter referred to as an "evaluation index M") according to the number of subject chords among the first chords X1 included in the candidate chord sequence Ys. As in the first embodiment, the subject chords are barre chords. As exemplified in FIG. 8, for example, the evaluation index M is the number of subject chords among the plural first chords X1 in each candidate chord sequence Ys. That is, the evaluation index M becomes smaller as the number of subject chords in a candidate, chord sequence Ys decreases. In general, playing of a musical piece becomes easier as the number of barre chords in the musical piece decreases. That is, the candidate chord sequence Ys becomes easier to play as the evaluation index M becomes smaller. As is understood from the above description, stated in other words, the evaluation index M is an index that indicates the difficult of playing of the candidate chord sequence Ys. More specifically, the analysis unit 31 determines, in order, whether the plural first chords X1 of each candidate chord sequence Ys are a subject chord and employs, as an evaluation index M, the number of first chords X1 each of which has been determined to be a subject chord. In FIG. 8, hatched blocks indicate first chords X1 that are subject chords.

The selection unit 35 shown in FIG. 7 selects one or more candidate chord sequences Ys from the plural candidate chord sequences Ys according to the evaluation indices M. More specifically, the selection unit 35 selects a candidate chord sequence Ys that is lowest in the number of subject chords indicated by the evaluation index M (i.e., a candidate chord sequence Ys having a smallest evaluation index M) from the plural candidate chord sequences Ys. That is, a candidate chord sequence Ys that is lowest in the difficulty of playing is selected from the plural candidate chord sequences Ys. The candidate chord sequence Ya is selected in a case that its evaluation index M is smallest among the evaluation indices M of the plural candidate chord sequences Ys.

The display control unit 34 shown in FIG. 7 displays the candidate chord sequence Ys selected by the selection unit 35 on the display device 11. Thus, the candidate chord sequence Ys that is easy to play among the plural candidate chord sequences Ys can be presented to the user. The display control unit 34 may present, to the user, the transposition amount δ of the candidate chord sequence Ys together with the candidate chord sequence Ys. The display control unit 34 may display all the plural candidate chord sequences Ys on the display device 11. In this configuration, the user can play a desired candidate chord sequence Ys among plural candidate chord sequences Ys displayed on the display device 11.

Figure 9:
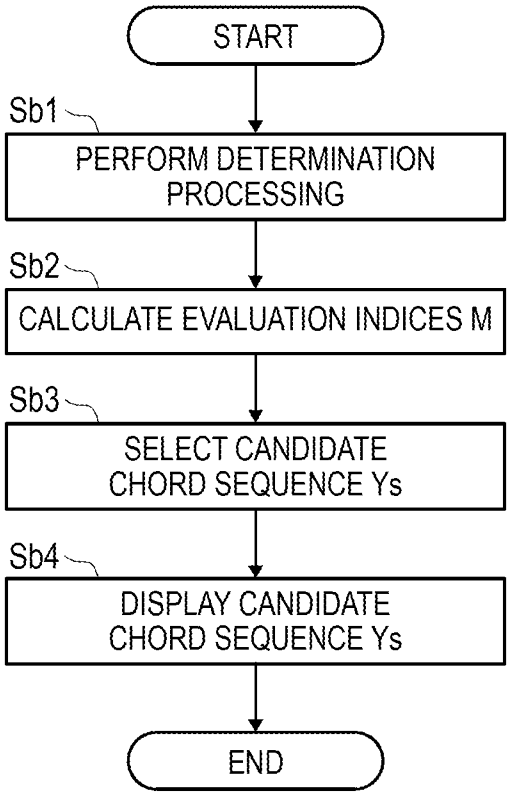
FIG. 9 is a flowchart of a process that is executed by the control device.

FIG. 9 is a flowchart of a process by which the control device 13 of the chord processing device 100 presents a candidate chord sequence Ys to the user. The process of FIG. 9 is started being triggered by, for example, an instruction from the user. The processing unit 32 determines plural transposed chord sequence Yb from a chord sequence Ya by performing the transposition processing (Sb1). The analysis unit 31 calculates an evaluation index M for each of plural candidate chord sequences Ys including the chord Sequence Ya and the plural transposed chord sequence Yb (Sb2). The selection unit 35 selects a chord sequence Ya having a smallest evaluation index M from the plural candidate chord sequences Ys (Sb3). The display control unit 34 displays the candidate chord sequence Ys selected by the selection unit 35 on the display device 11 (Sb4).

In the second embodiment, one or more candidate chord sequences Ys are selected from plural candidate chord sequences Ys according to evaluation indices M each of which indicates the number of subject chords included in the candidate chord sequence Ys. This makes it possible to present the user with a candidate chord sequence(s) Ys that is to be converted into the chord sequence Ya. In the second embodiment, in particular, since a candidate chord sequence (s) Ys is selected from plural candidate chord sequences Ys including plural transposed chord sequences Yb obtained by transposing a chord sequence Ya by different transposition amounts δ, candidate chord sequences Ys having a variety of keys can be presented to the user.

In the second embodiment, a candidate chord sequence Ys that is smallest in the number of subject chords indicated by evaluation indices M is selected from plural candidate chord sequences Ys. Thus, in a case that the user does not want subject chords, a candidate chord sequence Ys that is small in the number of subject chords can be presented. In a configuration of the second embodiment in which each subject chord is a chord that requires the user to press down one finger on plural strings simultaneously in playing a stringed instrument, a candidate chord sequence Ys is selected according to evaluation indices M each of which indicates the number of such chords. Thus, where, for example, the user does not want chords that require the user to press down one finger on plural strings, a candidate chord sequence Ys having a small number of such chords can be presented.

Embodiment 3

Figure 10:
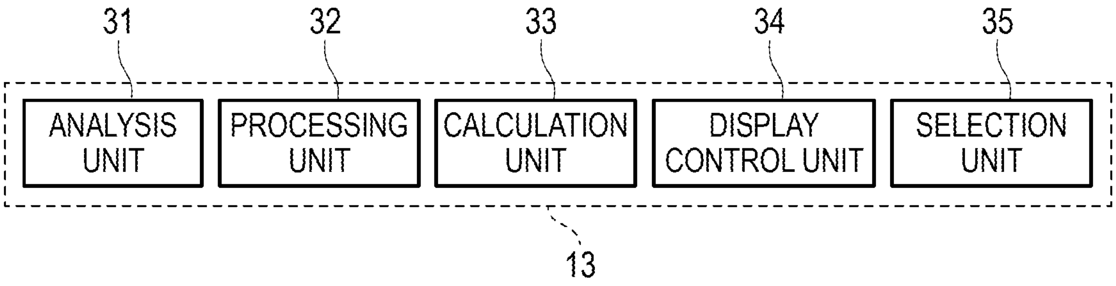
FIG. 10 is a block diagram showing a functional configuration of a control device employed in a third embodiment.

FIG. 10 is a block diagram showing a functional configuration of a chord processing device 100 according to a third embodiment. The chord processing device 100 according to the third embodiment performs the conversion processing of the first embodiment and the transposition processing of the second embodiment. More specifically, the chord processing device 100 converts, into second chords X2, ones (subject Chords) of plural first chords S1 in each of candidate chord sequences Ys as exemplified in the second embodiment. As in the first embodiment, each first chord X1 is converted into a second chord X2 in a case that the prescribed conditions (first condition and second condition) are satisfied.

Figure 11:
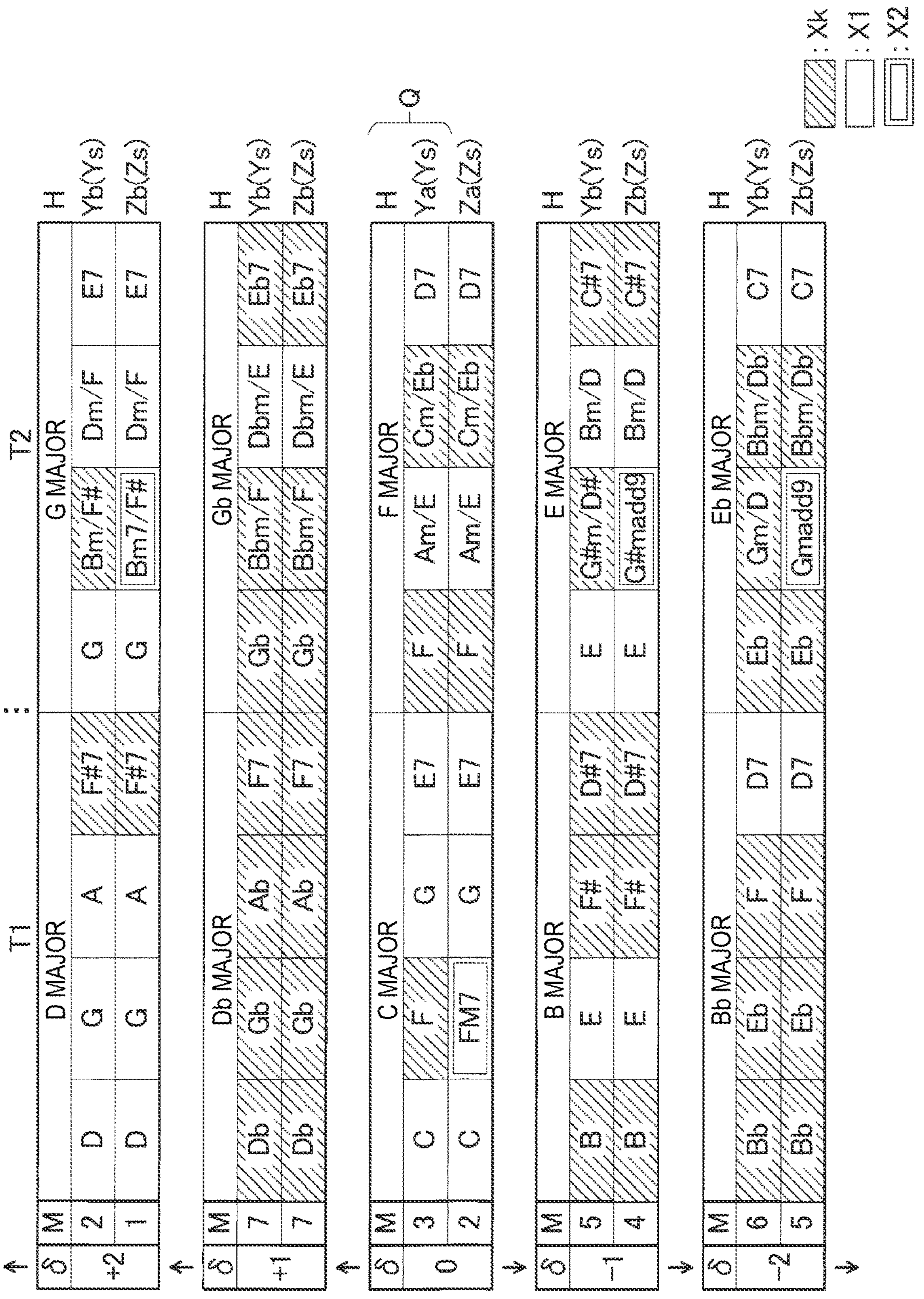
FIG. 11 is a schematic diagram showing plural candidate chord sequences.

The control device 13 employed in the third embodiment functions as an analysis unit 31, a processing unit 32, a calculation unit 33, a selection unit 35, and a display control unit 34. The processing unit 32 performs determination processing including transposition processing and conversion processing. As in the second embodiment, the processing unit 32 determines plural transposed chord sequence Yb by performing the transposition processing on a chord sequence Ya. FIG. 11 shows plural transposed chord sequence Yb determined by the transposition processing. As in the second embodiment, one chord sequence Ya and 11 transposed chord sequences Yb constitute 12 candidate chord sequences Ys.

As in the first embodiment, the analysis unit 31 determines, for each of candidate chord sequences Ys, whether each of first chords X1 constituting the candidate chord sequence Ys is a subject chord. That is, selected chords Xk (first chords X1 determined to be subject chords) are determined for each candidate chord sequence Ys by the processing through the analysis unit 31. In FIG. 11, selected chords Xk are indicated by hatched blocks.

The processing unit 32 determines a candidate chord sequence Zs by converting selected chords Xk in each candidate chord sequence Ys by the same conversion processing as employed in the first embodiment. In FIG. 11, a candidate chord sequence Zs obtained by the conversion processing is shown under a candidate chord sequence Ys before being subjected to the conversion processing. More specifically, the processing unit 32 converts a selected chord Xk into a second chord X2 in a case that the prescribed conditions (first condition and second condition) are satisfied, and does not convert the selected chord Xk in a case that these conditions are not satisfied. That is, each candidate chord sequence Zs is a chord sequence (i.e., a time-series arrangement of plural chords (first chords X1 and second chords X2) that is different from the candidate chord sequence Ys.

As in the first embodiment, the first condition is that a selected chord Xk is neither a tonic chord nor a dominant chord. As in the first embodiment, the second condition is that the degree of similarity of one, which is the highest in the degree of similarity with a selected chord Xk, of the plural second chords X2 in conversion data is higher than a threshold value. As in the first embodiment, a degree of similarity is calculated by the calculation unit 33. Each candidate chord sequence Zs obtained by the conversion processing is a chord sequence that is a mixture of first chords X1 and second chords X2. In FIG. 11, each second chord X2 is indicated by a double-line block. The number of selected chords Xk each candidate chord sequence Zs is smaller than that of selected chords Xk in the corresponding candidate chord sequence Ys. In a case that none of the selected chords Xk included in a candidate chord sequence Ys satisfies the first condition and the second condition, no chord arrangement difference occurs between the candidate chord sequence Ys and a candidate chord sequence Zs. That is, the number of selected chords Xk is not changed before and after the conversion processing.

As in the second embodiment, the analysis unit 31 shown in FIG. 10 calculates an evaluation index M for each of the plural candidate chord sequences Zs generated by the conversion processing. More specifically, the analysis unit 31 calculates, as an evaluation index M, the number of selected chords Xk included in each candidate chord sequence Zs. As in the second embodiment, the selection unit 35 selects a candidate chord sequence Zs that is smallest in the number of subject chords indicated by the evaluation index M among the plural candidate chord sequences Zs. The display control unit 34 displays the candidate chord sequence Zs selected by the selection unit 35 on the display unit 11.

Figure 12:
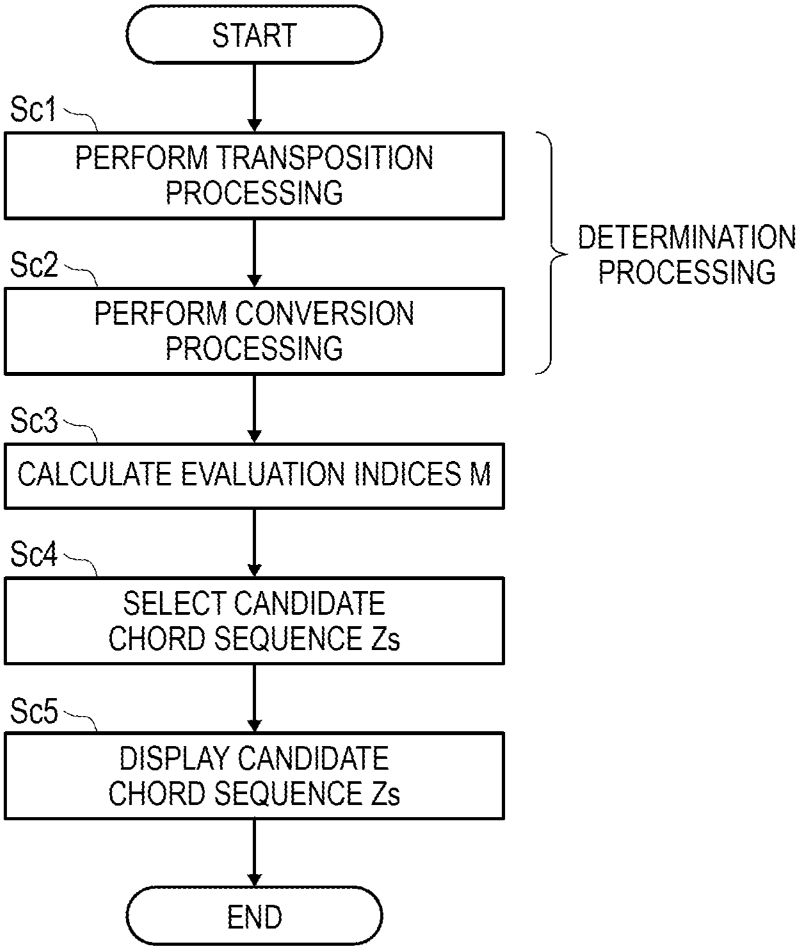
FIG. 12 is a flowchart of a process that is executed by the control device.

FIG. 12 is a flowchart of a process by which the control device 13 of the chord processing device 100 presents a candidate chord sequence Zs to the user. The process of FIG. 12 is started being triggered by, for example, an instruction from the user. The processing unit 32 determines plural transposed chord sequences Yb from a chord sequence Ya by performing the transposition processing (Sc1). The processing unit 32 determines candidate chord sequences Zs by performing the conversion processing on each of the candidate chord sequences Ys including the chord sequence Ya and the plural transposed chord sequences Yb (Sc2). That is, determination processing that includes steps Sc1 and Sc2 is performed. The analysis unit 31 calculates an evaluation index NI for each of plural candidate chord sequences Zs. The analysis unit 31 calculates an evaluation index M for each of the plural candidate chord sequences Zs (Sc3). The selection unit 35 selects a chord sequence Zs that is smallest in the number of subject chords indicated by the evaluation index M from the plural candidate chord sequences Zs (Sc4). The display control unit 34 displays the candidate chord sequence Zs selected by the selection unit 35 on the display device 11 (Sc5).

As is understood from the above description, in the third embodiment, an evaluation index M is calculated for each of candidate chord sequences Zs generated by the conversion processing and a candidate chord sequence Zs is selected from the plural candidate chord sequences Zs according to the evaluation indices M. Thus, it is possible to present the user with a candidate chord sequence Zs that is smaller in the number of selected chords Xk than in the second embodiment in which a candidate chord sequence Ys that is not subjected to the conversion processing is presented to the user. Furthermore, since the conversion processing is performed in a case that the prescribed conditions are satisfied, selected chords Xk that are maintained in musical impression from before the conversion processing can be presented to the user. In the third embodiment, each selected chord Xk may be converted into a second chord X2 irrespective of whether the prescribed conditions are satisfied. That is, each selected chord Xk is converted into a second chord X2 even if the prescribed conditions are not satisfied. In this configuration, every selected chord Xk is converted into a second chord X2.

<Modifications>

Specific modifications to be made of each embodiment exemplified above will be described below. Two or more modifications selected from the following examples in a desired manner may be combined together as appropriate within the confines that no discrepancy occurs.

(1) Although the first embodiment exemplifies the configuration in which the prescribed conditions include the first condition and the second condition, the prescribed conditions an not limited to this example. For example, there may be employed a configuration in which one of the first condition and the second condition constitutes the prescribed condition or a configuration in which the prescribed conditions include a third condition that is different from the first condition and the second condition. For example, the third condition is that a selected chord Xk is not a chord that is located in a particular interval (e.g., chorus part) of a musical piece. Only the third condition may constitute the prescribed condition. This modification is also applicable to the third embodiment.

(2) In each of the above embodiments, the subject chords are not limited to chords each of which requires a user to press down plural strings simultaneously by one finger of the user in playing a stringed instrument. Desired chords that a user wants to avoid playing are designated by the user. For example, if a user has more difficulty playing a chord as the chord has more constituent notes may designate subject chords according to the number of constituent notes. In this configuration, for example, such a chord that the number of constituent notes is larger than a threshold value is designed as a subject chord and such a chord that the number of constituent notes is smaller than the threshold value is designed as a second chord X2. It is noted that subject chords need not always be designated by a user; for example, barre chords may be designated as subject chords instead of being designated by a user.

(3) In the first embodiment, a second chord is not limited to a chord other than a subject chord. For example, a chord designated by a user may be employed as to second chord X2. For example, a chord that is easy to play to a user or a chord that a user wants to play may be designated as a second chord X2. This modification is also applicable to the third embodiment.

(4) Although in the second embodiment 11 transposed chord sequences Yb are determined by the transposition processing, the number of transposed chord, sequences Yb designated by the determination processing is optional. That is, a configuration can be employed in which one transposed chord sequence Yb is designated by the determination processing. Furthermore, plural transposed chord sequences Yb are determined by changing the transposition amount δ at intervals of a semitone, the transposition amounts δ used in the transposition processing are not limited to ones generated in such a manner. For example, transposed chord sequences Yb may be determined by changing the transposition amount δ at intervals of a whole tone. This modification is also applicable to the third embodiment.

(5) In the second embodiment, in a case that the evaluation index M becomes smallest in plural candidate chord sequences Ys, the selection unit 35 may select all candidate chord sequence Ys having the smallest evaluation index M. Alternatively, the selection unit 35 may select any one candidate chord sequence Ys (e.g., a candidate chord sequence Ys having a smallest transposition amount δ) among the plural candidate chord sequences Ys having the smallest evaluation index M. This modification is also applicable to the third embodiment.

(6) Although in the second embodiment the number of first chords X1 that are subject chords in each candidate chord sequence Ys is employed as an example evaluation index M, the evaluation index M is not limited to this example. For example, a weighted sum obtained by weighting the numbers of selected chords Xk using weights that reflect the degrees of difficulty of playing the respective selected chords Xk may be calculated as an evaluation index M. This modification is also applicable to the third embodiment.

(7) Although in the second embodiment a candidate chord sequence Ys having a smallest evaluation index M is selected, the method for selecting a candidate chord sequence Ys is not limited to this. For example, the selection unit 35 may select all candidate chord sequences Ys having smaller evaluation indices M than a chord sequence Ya does among the plural candidate chord sequences Ys. This modification is also applicable to the third embodiment.

(8) In the second embodiment, an attachment position of a capotasto may be presented according to the transposition amount δ of a candidate chord sequence Ys selected by the selection unit 35. This modification is also applicable to the third embodiment.

(9) Although in each of the above embodiments a chord sequence is presented to the user in the form or a display on the display device 11, the method for presenting a chord sequence to a user is not limited to it. For example, a chord sequence may be presented to a user in the form of aa sound emitted by a sound emitting device (e.g., speaker). The display device 11 and the sound emitting device are referred to comprehensively as a "presentation device."

(10) As described above, the above-exemplified functions of the chord processing device 100 are implemented by cooperation between a single or plural processors constituting the control device 13 and programs stored in the storage device 14. The programs relating to this disclosure can be presented in such a form as to be stored in a computer-readable recording medium and installed in a computer. For example, the recording medium is a non-transitory recording medium and a typical example of it is an optical recording medium (optical disc) such as a CD-ROM. However, the recording medium includes any types of known recording media such as a semiconductor recording medium and a magnetic recording medium. The non-transitory recording medium includes any types of known recording media for recording signals other than transitory, propagating signals and does not exclude volatile recording media. In a configuration in which a distribution apparatus distributes programs over a communication network, a storage device for storing programs in the distribution apparatus corresponds to the above-mentioned non-transitory recording medium.

(11) For example, the following methods and configurations are recognized on the basis of the above-described embodiments and modifications.

A chord processing method according to one mode (mode A1) comprises the steps of judging whether a first chord consisting of plural notes is a subject chord; and converting the first chord into a second chord that relates to the first chord in a case that the first chord is a subject chord and satisfies a prescribed chord-related condition, and not converting the first chord in a case that the first chord is a subject chord but does not satisfy the prescribed chord-related condition. According to this mode, where the first chord is a subject chord, the first chord is converted into the second chord that relates to the first chord in a case that it satisfies the prescribed condition and is kept without being converted into a second chord in a case that it does not satisfy the prescribed condition. Thus, chords can be converted while musical impression is maintained in contrast to a case that all first chords are converted into second chords irrespective of the prescribed conditions.

In one example (mode A2) of the mode A1, the prescribed chord-related condition includes that the first chord that has been determined to be a subject chord is not a chord that has, as a root, a note providing a prescribed interval relationship with a keynote of a key. According to this mode, musical impression can be maintained because first chords each of which has, as a root, a note providing the prescribed interval relationship with the keynote of a key (i.e., first chords that are important maintaining the tonality) are kept as they are without being converted. The prescribed chord-related condition includes that the first chord that has been determined to be a subject chord is neither a dominant chord nor a tonic chord.

In an example (mode A3) of the mode A1 or the mode A2, the prescribed chord-related condition includes that the second chord having a highest degree of similarity with the first chord among plural chords is higher than a threshold value in the degree of similarity. In a case that the first chord is converted unto a second chord that is not similar to the first chord in a musical sense, the musical sense may be impaired. According to this mode, the first chord is converted into a second chord in a case that the second chord has a highest degree of similarity with the first chord among plural chords is higher than the threshold value in the degree of similarity. That is, the first chord is kept as it is without being converted in a case that the degree of similarity of the second chord is lower than the threshold value (i.e., it is inferred that the second chord is not similar to the first chord in a musical sense). Thus, musical impression can be maintained.

In an example (mode A4) of any one of the mode A1 to the mode A3, the subject chord is a chord that requires a user to press down one finger on plural strings simultaneously in playing a stringed instrument. According to this mode, where a first chord is a chord that requires a user to press down one finger on plural strings simultaneously, the first chord can be converted into a second chord.

In an example (mode A5) of any one of the mode A1 to the mode A4, the subject chord includes one or plural chords and the second chord is one of chords other than the subject chord. According to this mode, the first chord can be converted into a second chord that is not the subject chord when, for example, a user wants to avoid playing the subject chord.

In an example (mode A6) of any one of the mode A1 to the mode A5, the presentation device is caused to present the second chord instead of the first chord in a case that the first chord has been converted into a second chord, and is caused to display the first chord in a case that the first chord has not been converted. In this mode, the second chord is presented to a user instead of the first chord in a case that the first chord has been converted into a second chord, and the first chord is presented to the user in a case that it has not been converted. This makes it possible to present a user with a chord that is maintained in musical impression.

A chord processing method according to one mode (mode B1) of the disclosure comprises the steps of determining a transposed chord sequence in which plural chords that different than in a base chord sequence are arranged in time series by determination processing including transposition of the base chord sequence in which plural chords are arranged in time series; calculating an evaluation index for each of plural candidate chord sequences including the base chord sequence and the transposed chord sequence according to the number of subject chords included in each candidate chord sequence and selecting one or more candidate chord sequences from the plural candidate chord sequences according to their evaluation indices. According to this mode, because for each of the plural candidate chord sequences including the base chord sequence and the transported chord sequences, one or more candidate chord sequences can be selected from plural candidate chord sequences in response to the evaluation index according to the number of subject chords included in the candidate chord sequence a candidate chord sequence(s) to be converted into the base chord sequence can be presented to a user. The evaluation index may be the number of subject chords. The evaluation index may be calculated by giving weights to the respective subject chords.

In an example (mode B2) of the mode B1, the determination processing determines plural transposed chord sequences by transposing the base chord sequence by different transposition amounts and the plural candidate chord sequences include the plural transposed chord sequences. According to this mode, since candidate chord sequences are selected from plural candidate chord sequences including the plural transposed chord sequences obtained by transposing the base chord sequence by different transposition amounts, candidate chord sequences of a variety of keys can be presented to a user.

In an example (mode B3) of the mode B1 or the mode B2, at the step of selecting a candidate chord sequence(s), a candidate chord sequence that is smallest in the number of subject chords indicated by an evaluation index is selected from the plural candidate chord sequences. In this mode, a candidate chord sequence that is smallest in the number of subject chords indicated by an evaluation index is selected from the plural candidate chord sequences. Thus, a candidate chord sequence that is small in the number of subject chords can be presented in, for example, a case that a user does not want subject chords.

In an example (mode B4) of any of the mode B1 to the mode B3, each subject chord is a chord that requires a user to press down one finger on plural strings simultaneously in playing a stringed instrument. In this mode, a candidate chord sequence(s) is selected according to evaluation indices relating to chords each of which requires a user to press down one finger on plural strings simultaneously. Thus, a candidate chord sequence(s) that is small in the number of subject chords can be presented in, for example, a case that a user does not want chords each of which requires the user to press down one finger on plural strings simultaneously.

In an example (mode B5) of any of the mode B1 to the mode B4, the determination processing includes processing of converting a chord that is each subject chord among the plural chords of each candidate chord sequence into another chord relating to this chord in a case that the chord satisfies a prescribed chord-related condition, and not converting the subject chord in a case that the chord does not satisfy the prescribed condition. In this mode, in each candidate chord sequence, each chard that is a subject chord among the plural chords of the candidate chord sequence is converted into another chord in a case that the chord satisfies the prescribed condition. Thus, a candidate chord sequence can be presented to a user that is smaller in the number of chords that are subject chords than in a case that chords that are subject chords in a candidate chord sequence are not converted into other chords. Since each chord that is a subject chord is not converted in a case that it does not satisfy the prescribed condition, selected chords that are maintained in musical impression can be presented to a user.

In an example (mode B6) of any of the mode B1 to the mode B5, the presentation device is caused to present the one or more selected candidate chord sequences. According to this mode, the one or more selected candidate chord sequences are presented to a user by the presentation device.

Each mode of the disclosure is also implemented as a chord processing device that performs the chord processing method according to each of the above-exemplified modes or a program that causes a computer to perform the chord processing method according to each of the above-exemplified modes.

What is claimed is:

1. A chord processing method executable by a computer, the chord processing method comprising:

- receiving a first chord consisting of plural notes among a plurality of first chords included in a chord sequence of a musical piece;
- determining whether the first chord is a subject chord; and
- in a state where the determining determines that the first chord is the subject chord:
  - determining whether the first chord satisfies a prescribed chord-related condition relating to the first chord and a second chord that relates to the first chord, wherein:
    - the prescribed chord-related condition includes at least one of:
      - the first chord that has been determined to be the subject chord not including, as a root, a note providing a prescribed interval relationship with a keynote of a key; or
      - the second chord, which is selected from among plural second chords, providing a highest degree of similarity with the first chord among plural chords that is higher than a threshold value in a degree of the similarity,
    - satisfying the prescribed chord-related condition allows an unconverted chord sequence to a converted chord sequence,
    - the unconverted chord sequence is where the first chord is not converted to the second chord, and
    - the converted chord sequence is where the first chord is converted to the second chord;
  - converting the first chord to the second chord in a state where the first chord satisfies the prescribed chord-related condition; and
  - not converting the first chord in a state where the first chord does not satisfy the prescribed chord-related condition.

2. The chord processing method according to claim 1, wherein the prescribed chord-related condition further includes the first chord that has been determined to be the subject chord being neither a dominant chord nor a tonic chord.

3. The chord processing method according to claim 1, wherein the subject chord requires a user to press down plural strings simultaneously by one finger in playing a stringed instrument.

4. The chord processing method according to claim 1, wherein the subject chord includes one or plural chords and the second chord is other than the subject chord.

5. The chord processing method according to claim 1, wherein the second chord, instead of the first chord, is presented on a presentation device in a state where the first chord has been converted to the second chord, while the first chord is presented on the presentation device in a state where the first chord has not been converted.

6. A chord processing device comprising:
- a memory storing instructions; and
- a processor configured to implement the stored instructions to execute a plurality of tasks, including:
  - a receiving task that receives a first chord consisting of plural notes among a plurality of first chords included in a chord sequence of a musical piece;
  - an analysis task that determines whether the first chord is a subject chord;
  - a converting task that, in a state where the analysis task determines that the first chord is the subject chord:
    - determines whether the first chord satisfies a prescribed chord-related condition relating to the first chord and a second chord that relates to the first chord, wherein:
      - the prescribed chord-related condition at least one of:
        - the first chord that has been determined to be the subject chord not including, as a root, a note providing a prescribed interval relationship with a keynote of a key; or
        - the second chord, which is selected from among plural second chords, providing a highest degree of similarity with the first chord among plural chords that is higher than a threshold value in a degree of the similarity,
      - satisfying the prescribed chord-related condition allows an unconverted chord sequence to a converted chord sequence,
      - the unconverted chord sequence is where the first chord is not converted to the second chord, and
      - the converted chord sequence is where the first chord is converted to the second chord;
    - converts the first chord to the second chord in a state where the first chord satisfies the prescribed chord-related condition; and
    - not convert the first chord in a state where the first chord does not satisfy the prescribed chord-related condition.

7. The chord processing device according to claim 6, wherein the prescribed chord-related condition further includes the first chord that has been determined to be the subject chord being neither a dominant chord nor a tonic chord.

8. The chord processing device according to claim 6, wherein the subject chord requires a user to press down plural strings simultaneously by one finger in playing a stringed instrument.

9. The chord processing device according to claim 6, wherein the subject chord includes one or plural chords and the second chord is other than the subject chord.

10. The chord processing device according to claim 6, wherein the plurality of tasks further include:
- a presentation control task that controls presentation of a chord to cause a presentation device to present the second chord instead of the first chord in a state where the first chord has been converted to the second chord, while causes the presentation device to present the first chord in a state where the first chord has not been converted.

11. A non-transitory computer-readable medium storing a program executable by a computer to execute a chord processing method comprising:
- receiving a first chord consisting of plural notes among a plurality of first chords included in a chord sequence of a musical piece;
- determining whether the first chord is a subject chord;
- in a state where the determining determines that the first chord is the subject chord:
  - determining whether the first chord satisfies a prescribed chord-related condition relating to the first chord and a second chord that relates to the first chord, wherein:
    - the prescribed chord-related condition includes at least one of:
      - the first chord that has been determined to be the subject chord not including, as a root, a note providing a prescribed interval relationship with a keynote of a key; or
      - the second chord, which is selected from among plural second chords, providing a highest degree of similarity with the first chord among plural chords that is higher than a threshold value in a degree of the similarity,
    - satisfying the prescribed chord-related condition allows an unconverted chord sequence to a converted chord sequence,
    - the unconverted chord sequence is where the first chord is not converted to the second chord, and
    - the converted chord sequence is where the first chord is converted to the second chord;
  - converting the first chord to the second chord in a state where the first chord satisfies the prescribed chord-related condition; and
  - not converting the first chord in a state where the first chord does not satisfy the prescribed chord-related condition.

* * * * *